(12) United States Patent
Jibbe

(10) Patent No.: US 8,078,924 B2
(45) Date of Patent: Dec. 13, 2011

(54) METHOD AND SYSTEM FOR GENERATING A GLOBAL TEST PLAN AND IDENTIFYING TEST REQUIREMENTS IN A STORAGE SYSTEM ENVIRONMENT

(75) Inventor: Mahmoud K. Jibbe, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 1314 days.

(21) Appl. No.: 11/228,771

(22) Filed: Sep. 16, 2005

(65) Prior Publication Data

US 2007/0079189 A1 Apr. 5, 2007

(51) Int. Cl.
*G06F 11/00* (2006.01)
*G06F 11/30* (2006.01)
*G06F 9/44* (2006.01)
*G01R 31/28* (2006.01)
*G01N 37/00* (2006.01)
*G21C 17/00* (2006.01)

(52) U.S. Cl. ......... 714/724; 714/38.1; 702/81; 702/182; 717/100; 717/102; 717/124; 717/125; 717/168

(58) Field of Classification Search ........................ None
See application file for complete search history.

(56) References Cited

U.S. PATENT DOCUMENTS

| | | | | |
|---|---|---|---|---|
| 5,633,813 A * | 5/1997 | Srinivasan | ....................... | 703/14 |
| 6,442,714 B1 * | 8/2002 | Griffin et al. | .................... | 714/46 |
| 6,647,513 B1 * | 11/2003 | Hekmatpour | .................... | 714/37 |
| 6,732,296 B1 * | 5/2004 | Cherny et al. | .................... | 714/32 |
| 6,742,166 B2 * | 5/2004 | Foster et al. | ....................... | 716/4 |
| 6,783,904 B2 * | 8/2004 | Strozewski et al. | ............. | 430/30 |
| 6,973,417 B1 * | 12/2005 | Maxwell et al. | .................. | 703/2 |
| 6,978,210 B1 * | 12/2005 | Suter et al. | ....................... | 702/13 |
| 7,007,251 B2 * | 2/2006 | Hekmatpour | ..................... | 716/4 |
| 7,370,043 B1 * | 5/2008 | Shelton et al. | .................... | 707/4 |
| 2002/0048212 A1 * | 4/2002 | Hill et al. | .......................... | 366/8 |
| 2002/0138510 A1 | 9/2002 | Tan | ............................. | 707/501.1 |
| 2003/0018945 A1 * | 1/2003 | Foster et al. | ....................... | 716/5 |
| 2003/0212924 A1 * | 11/2003 | Avvari et al. | .................... | 714/38 |
| 2003/0213613 A1 * | 11/2003 | Strozewski et al. | ........... | 174/250 |
| 2004/0078684 A1 * | 4/2004 | Friedman et al. | ............... | 714/38 |

(Continued)

OTHER PUBLICATIONS

Morgan L. Swink and Roger Calantone, Design-Manufacturing Integration as a Mediator of Antecedents to New Product Design Quality, Nov. 2004, IEEE, vol. 51, No. 4.*
Cathy A. Rusinko, Exploring the Use of Design-Manufacturing Integration (DMI) to Facilitate Product Development: A Test of Some Practices, Feb. 1999, IEEE, vol. 46, No. 1.*

(Continued)

*Primary Examiner* — Cynthia Britt
*Assistant Examiner* — Guerrier Merant
(74) *Attorney, Agent, or Firm* — Suiter Swantz pc llo

(57) ABSTRACT

The present invention is directed to a system and method for a quality assurance tool generating test plans and identifying new test requirements for a new version of a product. Old versions of the product may be previously tested and test plan documents associated with previously tested versions of the product may be stored in a database. The database may store test plans, test configurations, test scopes, and the like for previously tested versions of the product. Product design requirements may be determined based on received customer desired features for the new version. The database may be updated by adding new tests for new features of the new version. A test plan document for the product may be generated based on the updated database. The generated test document may be verified through automatically generating a general test plan for the new version of the product by querying updated database with the product design requirements.

14 Claims, 7 Drawing Sheets

U.S. PATENT DOCUMENTS

| | | | |
|---|---|---|---|
| 2004/0107415 A1* | 6/2004 | Melamed et al. | 717/124 |
| 2005/0080502 A1* | 4/2005 | Chernyak et al. | 700/97 |
| 2005/0204201 A1* | 9/2005 | Meenakshisundaram et al. | 714/38 |
| 2006/0064178 A1* | 3/2006 | Butterfield et al. | 700/18 |
| 2006/0069958 A1* | 3/2006 | Sawicki et al. | 714/33 |
| 2006/0107141 A1* | 5/2006 | Hekmatpour | 714/724 |

OTHER PUBLICATIONS

Gupta, S.C.; Sinha, M.K.; Impact of software testability considerations on software development life cycle, 1994.*

Evbuomwan, N.F.O. ; Sivaloganathan, S. ; Jebb, A. ; Design function deployment—a design for quality system, May 6, 1994, Customer Driven Quality in Product Design, IEE Colloquium, pp. 7/1-7/3.*

* cited by examiner

ⓐ ⓑ

Test Plan Content

Global Test Design Document
TDD Version: RAID Test Version 1.0
Release Version: Release 1.0
User Name:M.K.Jibber
Date: 02/20/2005

1. Test Scope
   This test Design Document verifies the followings:
   -Host Interface
   -Santricty Software
   -O/S Specific
   -New HBA 2. Test Configuration
   The test effort requires the following configurations to complete the certifications of the new requirements embedded in this RAID system release:

-Host Interface
     -2X2X2X4CFG 8
       -Server: 2
       -Switch: 2
       -Controller Module: 2
     -Tray Count: 3, Drive Count: 18
     -Tray Count: 1, Drive Count: 12
   -Host Interface <u>312</u>

Ready

Figure 5(ii)

METHOD AND SYSTEM FOR GENERATING A GLOBAL TEST PLAN AND IDENTIFYING TEST REQUIREMENTS IN A STORAGE SYSTEM ENVIRONMENT

FIELD OF THE INVENTION

The present invention generally relates to the field of data storage systems, particularly a system and method for generating test plans and identifying new test requirements for quality assurance in a hardware or software product.

BACKGROUND OF THE INVENTION

During design and development of a hardware or software product, manufacturers often put great effort to assure desired quality of the hardware or software product. The production validation (quality assurance) process involves various activities such as test plan and management, test execution, test report, and the like. Extensive testing is often completed on the product to assure performance and that the product meets customer requirements, industry standards for hardware, software, and BIOS (basic input/output system) compatibility.

Testers may need to perform tests on a product with new features desired by a customer. Conventionally, a set of pre-determined test requirements and recorded results for legacy features of the product may be readily available by a quality assurance tool. However, the legacy test plan may or may not cover verification of new features. This may cause testers to conduct improper tests (ad hoc testing) and/or waste valuable resources during a product validation process.

Thus, it would be desirable to provide a method and system to address the foregoing-described problems.

SUMMARY OF THE INVENTION

Accordingly, the present invention provides a quality assurance system and method for identifying new test requirements, maintaining a test database and generating test plans for different versions of a product by mapping new requirements, for which a user assigns a name for each requirement using a unique naming convention, to a test database, which uses the same naming convention for legacy test cases, to derive the test cases required to verify different aspects of the new features and to identify what new test cases are required to be scoped for aspects that are not covered in the test database. The present method may automatically generate a test plan from the selected legacy tests and new test cases defined by a test engineer. In an exemplary aspect of the present invention, a method for ensuring desired quality of different versions of a product is provided. Old versions of the product may be previously tested, and test plan documents associated with previously tested versions of the product may be stored in a database. The database may store test plans, test configurations, test scopes, and the like for previously tested versions of the product. Customer desired features including new and/or modified features of a new version of the product may be received. Product design requirements may be determined based on the received customer desired features. Then, an initial test plan (first test plan) for the product may be generated by querying a database based on said product design requirements. The method may determine whether the initial test plan does not include a test for each new and/or modified feature. If the initial test plan does not include a test for a certain new feature, a new test for the certain new feature may be provided by a tester. The database may be updated by adding the provided new test. Next, a test plan document for the product may be generated based on the updated database. The generated test plan document may be verified through a comparison with a test plan generated by querying the updated database with the product design requirements.

In an additional aspect of the present invention, a Graphic User Interface (GUI) may be provided to allow a user (tester) to provide product design requirements and new test procedures. New feature requirements for the new version of the product may be identified from a drop menu on the GUI, which based on the name of the new features. The menu has the capability of adding entries to new keys to the database if the key does not exit in the database. Then, descriptive keys for the verified new features, sub-features, or modified features of a new product may be created.

In another aspect of the present invention, the test plan may be extracted, or derived from existing test cases stored in the database. New tests required to verify the new features of the product under development may be identified. Test areas, test cases, and/or test steps which require modification to handle new features or modified legacy features in the product under design may be identified. In this manner, the granularity of the existing test cases stored in databases may be enhanced.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIGS. 5(i) and 5(ii) illustrate a screen of the Graphic User Interface shown in FIG. 3, where the GUI is suitable for generating a test plan in accordance with an exemplary embodiment of the present invention.

DETAILED DESCRIPTION OF THE INVENTION

Reference will now be made in detail to the presently preferred embodiments of the invention, examples of which are illustrated in the accompanying drawings.

In the following description, numerous specific descriptions are set forth in order to provide a thorough understanding of the present invention. It should be appreciated by those skilled in the art that the present invention may be practiced without some or all of these specific details. In some instances, well known process operations have not been described in detail in order not to obscure the present invention.

Figure 1:
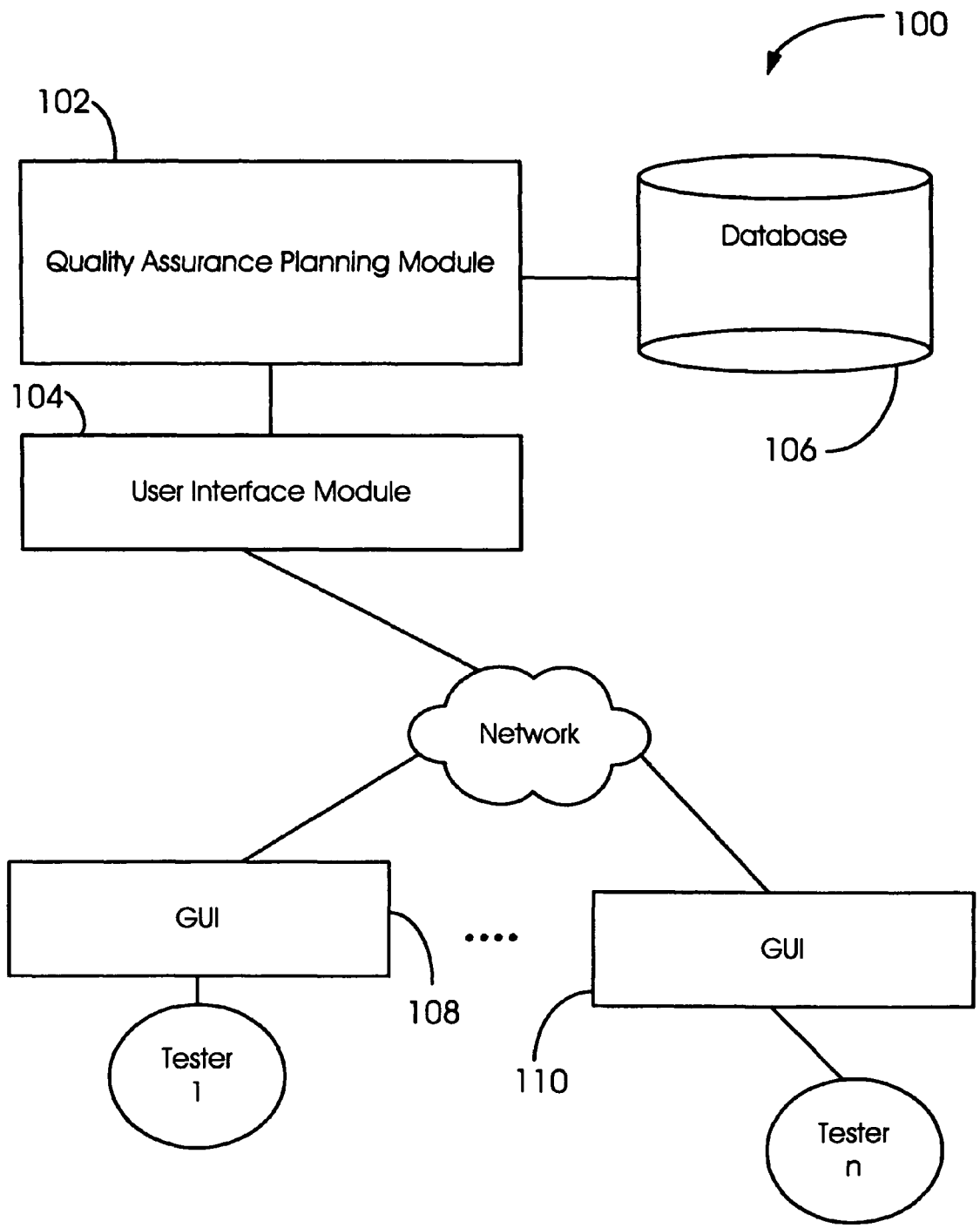
FIG. 1 illustrates a block diagram of a QA system in accordance with an exemplary embodiment of the present invention.

Referring now to FIG. 1, a block diagram of a Quality Assurance (QA) system 100 in accordance with an exemplary embodiment of the present invention is shown. The QA system 100 may include a QA planning module 102, a user interface module 104, a test database 106, and a test database management module (not shown). The QA system 100 may be configured to ensure desired quality of different versions of a product. Old versions of the product may be previously tested, and test plan documents associated with previously tested versions of the product may be stored in the test database 106. The test database 106 may store test plans, test configurations, test scopes, and the like for previously tested versions of the product. The QA planning module 102 may be configured to query the test database 106 with product requirements for a new version of the product, build a test plan based on the queried information, identify a product requirement requiring new tests to be defined, and the like. In an embodiment, GUIs 108 and 110 may be provided for several users to interact with the QA system 100. The GUIs 108 and 110 may be provided by the user interface module 104 to the users. The GUI 108 or 110 may be suitable for receiving various user inputs and for displaying menu options and QA system outputs including general test plan output and test plan documents for the new version of the product. The test plan output on the GUI 108 or 110 may include an indication for lack of predefined tests for new features in the test database. The indication may be highlighted, blinked or the like to be visually noticeable. The user may provide new tests for the new features through the GUIs 108 and 110. Upon reception of the new tests through the GUI 108 or 110, the test database management module (not shown) may update the database 106 accordingly. Then, the QA planning module 102 may generate a test plan document for the new version of the product by querying the updated test database 106.

Figure 2:
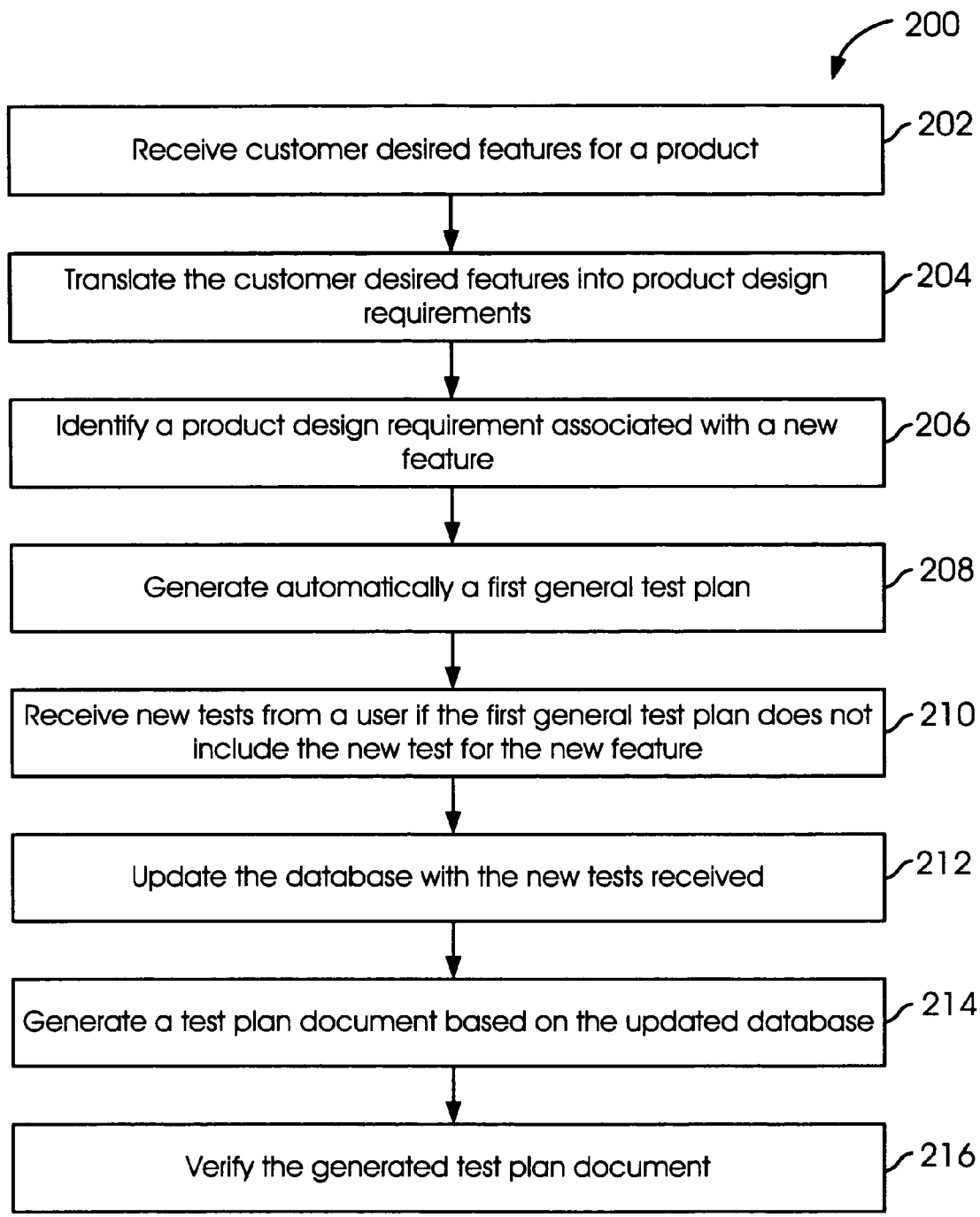
FIG. 2 illustrates a flow diagram of a method for ensuring desired quality of a product in accordance with an exemplary embodiment of the present invention.

Referring now to FIG. 2, a flow diagram of a method 200 for ensuring desired quality of a product in accordance with an exemplary embodiment of the present invention is shown. The method 200 may be implemented in the system 100 shown in FIG. 1. Customer desired features for a new product may be received 202. The customer desired features may be translated into high level product requirements suitable for being used in a QA system 204. The customer desired features for the new product may include legacy features, new features, modified features, and the like. A product design requirement associated with a new feature may be identified 206. Test plan information for the product may be retrieved through querying a test database with the high level product requirements. A first general test plan may be generated based on the test plan information 208. In some instances, the test plan information does not include test information for new features or modified features. If the new tests are not found in the test plan information retrieved from the database, the new tests are to be defined for the new feature. The new tests may be provided by the user if the first general test plan does not include the new test for the new feature 210. Upon reception of the new tests, the test database may be updated accordingly 212. A test plan document for the new product may be generated based on the updated database 214. The test plan document may include test scope, detail cases, a test configuration, test resources, test duration, a test summary, and the like. The generated test plan document may be verified 216.

Figure 3:
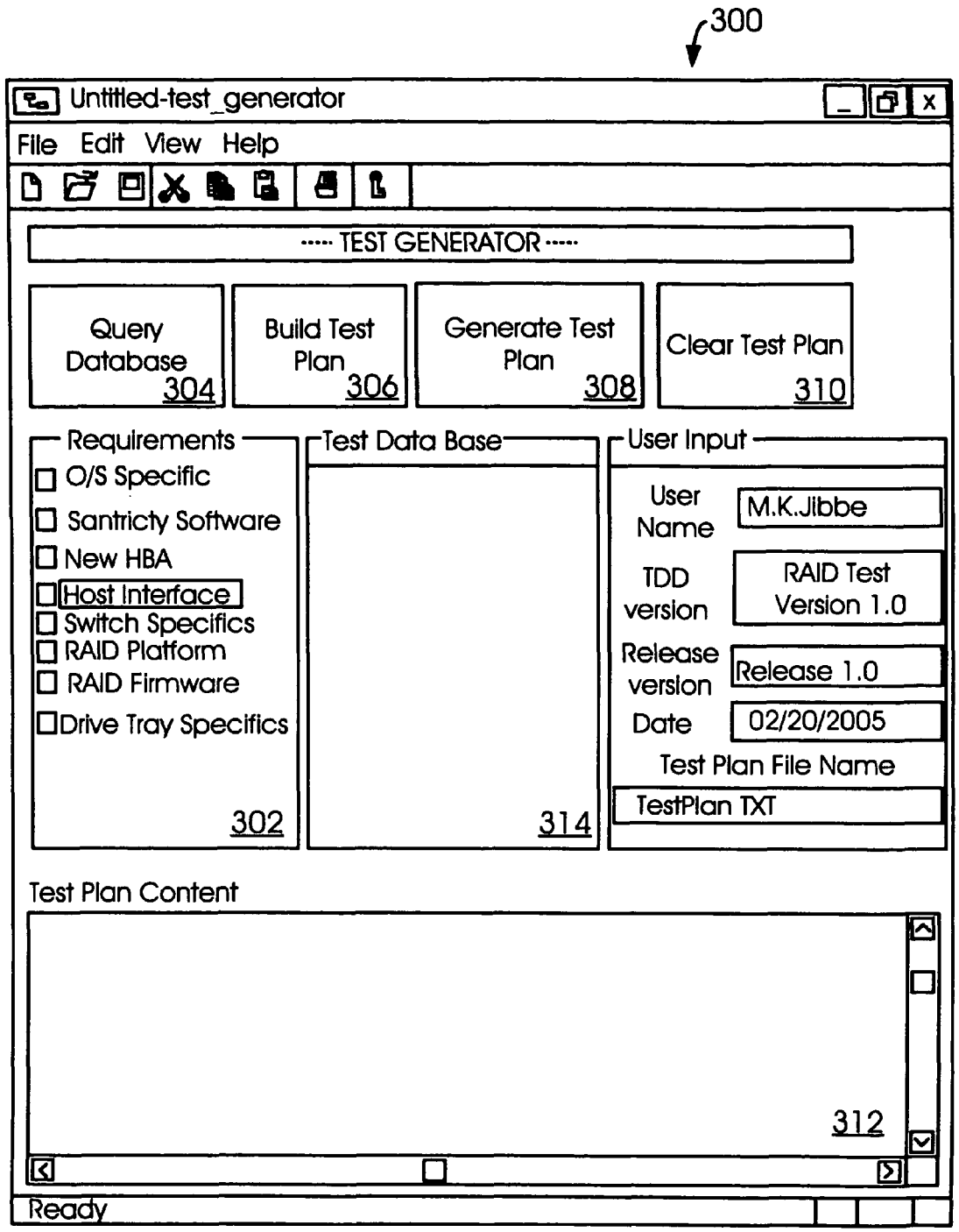
FIG. 3 illustrates a screen shot of a Graphic User Interface displayed for a user in accordance with an exemplary embodiment of the present invention.
Figure 4I:
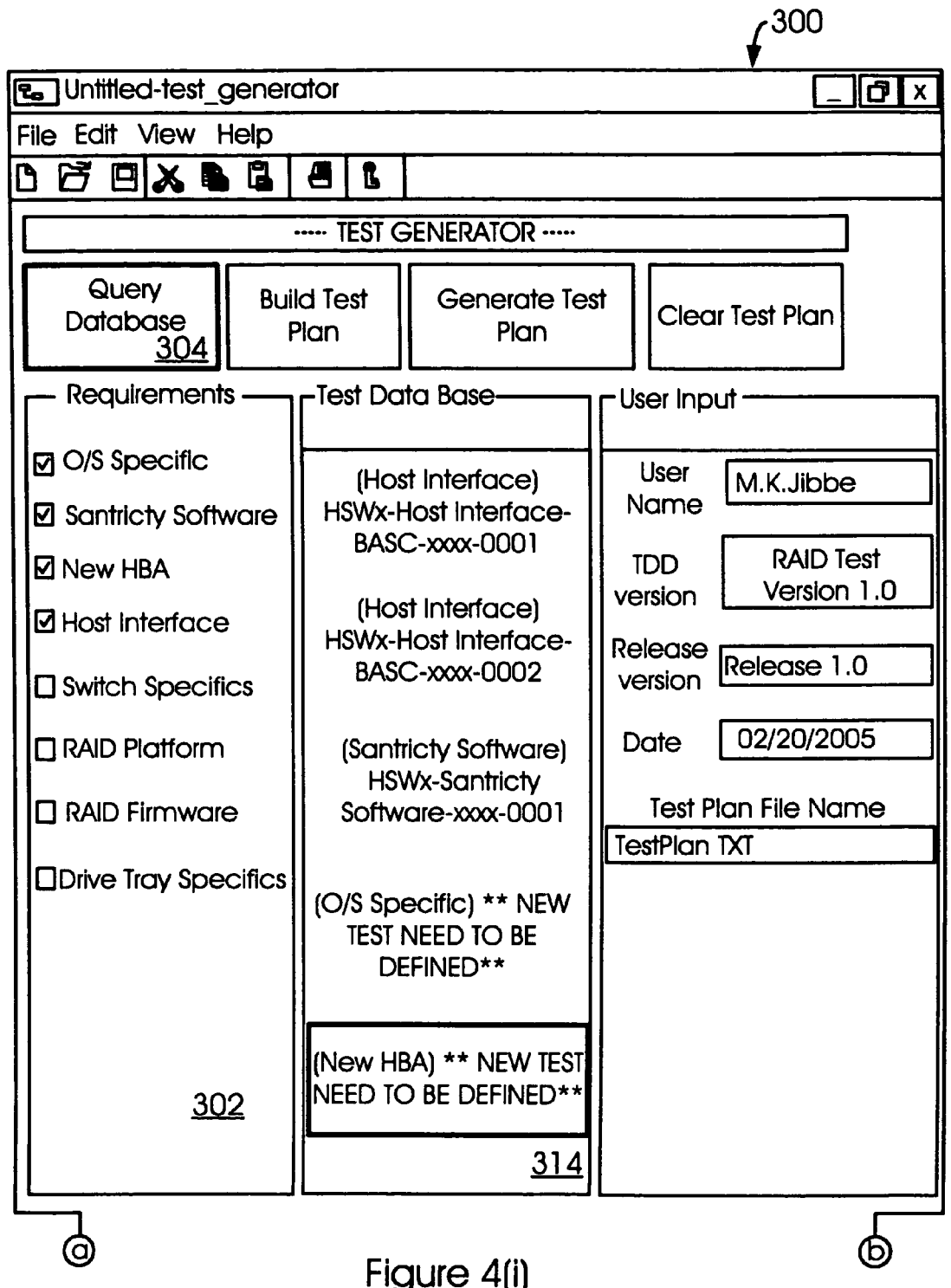
FIGS. 4(i) and 4(ii) illustrate a screen shot of the Graphic User Interface shown in FIG. 3, where the GUI is suitable for receiving user selected product requirements in accordance with an exemplary embodiment of the present invention.
Figure 4:
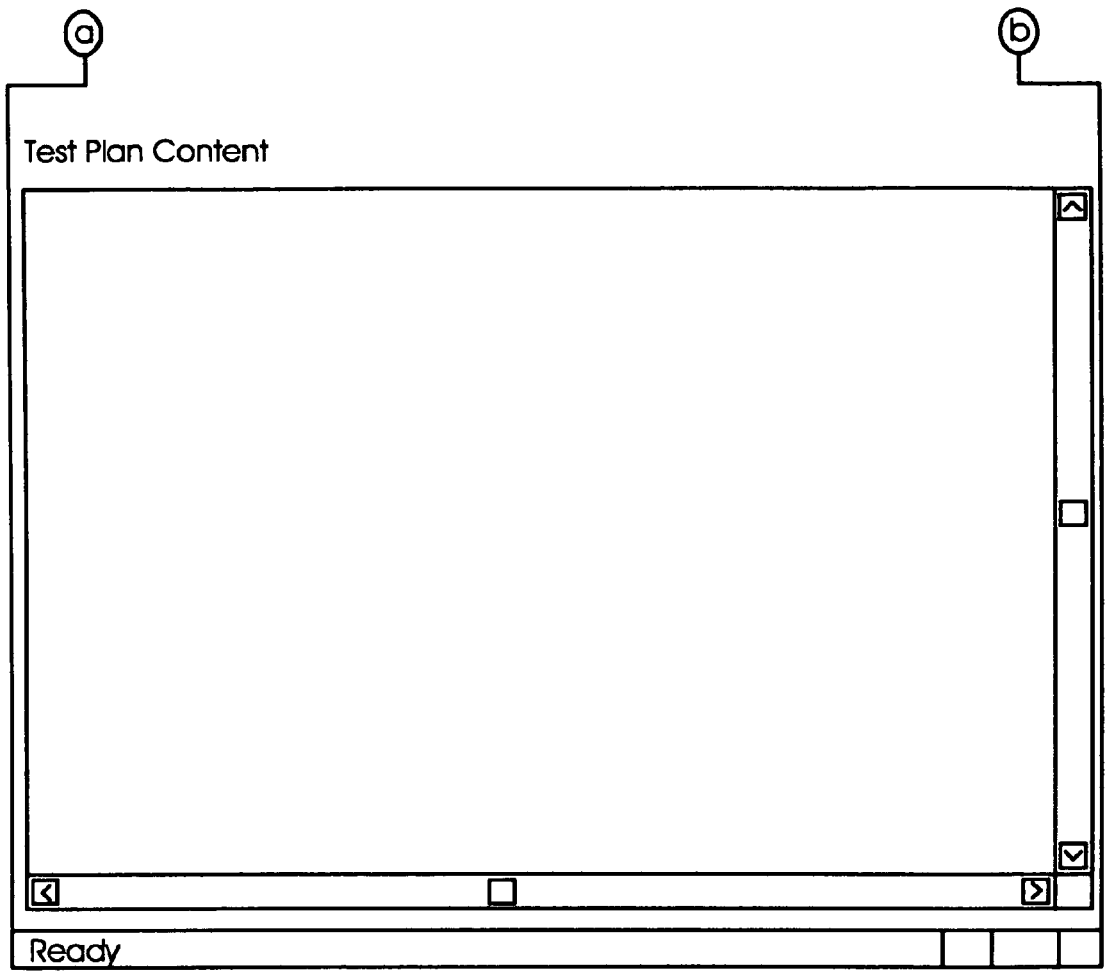
Figure 5I:
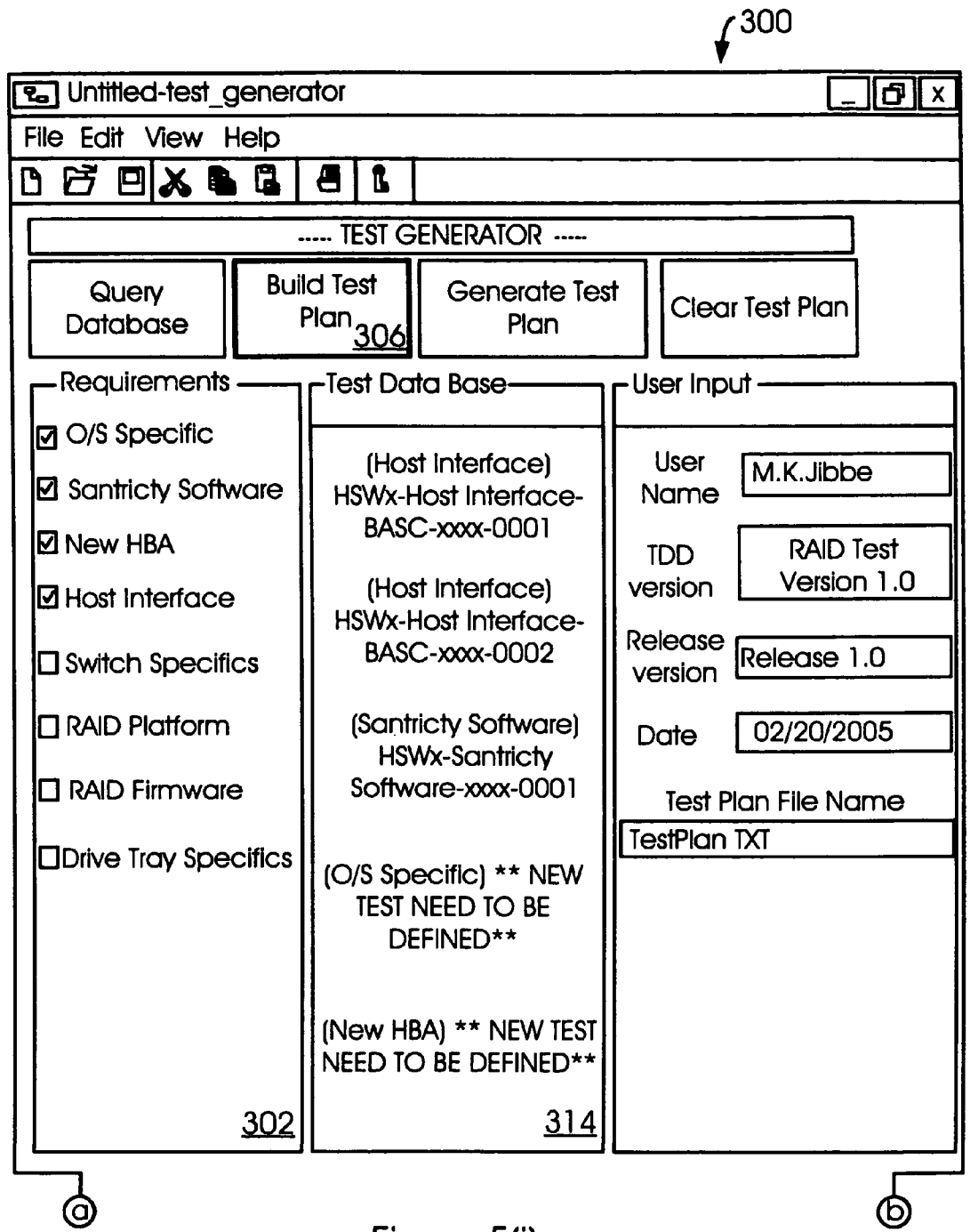

FIG. 3 illustrates a screen shot of a Graphic User Interface 300 displayed for a user in accordance with an exemplary embodiment of the present invention. The GUI 300 may include a requirements section 302, a query database option 304, a build test plan option 306, a generate test plan option 308, a clear test plan option 310, a test plan content section 312, and a test database section 314. A user may select requirements from the requirements section 302 to check whether there are test cases in the database to verify these product requirements. For example, as shown in FIG. 4(i), the O/S Specific requirement, the Santricty Software requirement, the New HBA requirement, and the Host Interface requirement have been selected, and the query database option 304 has been selected. After querying the database, it may be reported in the test database section 314 that the database includes test plan information (i.e., test cases which includes test steps required to verify the requirement under question) for some of the selected requirements and no test plan/test case information for the rest of the selected requirements. For example, in FIG. 4(i) the database includes test plan/test case information for the Host Interface requirement and the Santricty Software requirement, but no test plan/test case information for the O/S Specific requirement and the New HBA requirement. Under this scenario, a user may need to define the test case information for the selected requirements that have no corresponding pre-existing test case information in the database. After the test plan information is received, the database may be updated. Upon the build test plan option 306 is selected, the test plan content (i.e., test file) may be displayed in the test plan content section 312 (see FIG. 5(ii)).

In an exemplary embodiment, the structure of the database for the test database section 314 is as follows:

```
<?xml version="1.0" encoding="UTF-8" ?>
<TEST_DATA>
 <TEST>
  <NAME>HSWx-HostInterface-BASC-xxxx-0001</NAME>
  <OBJECTIVE>Increase volume capacity</OBJECTIVE>
  <CONFIGURATION>
   <NAME>2 x 2 x 2 x 4 ** CFG 8 **</NAME>
   <SERVER>2</SERVER>
   <SWITCH>2</SWITCH>
   <CONTROLLER_MODULE>2</CONTROLLER_MODULE>
   <TRAYS>
    <TRAY>
     <COUNT>3</COUNT>
     <DRIVES>18</DRIVES>
    </TRAY>
    <TRAY>
     <COUNT>1</COUNT>
     <DRIVES>12</DRIVES>
    </TRAY>
   </TRAYS>
  </CONFIGURATION>
  <STEPS>
   <STEP>Run SANSCAN</STEP>
   <STEP>Create 5 RAID volumes</STEP>
   <STEP>Run I/O</STEP>
   <STEP>Save MEL</STEP>
  </STEPS>
  <DURATION>.2</DURATION>
  <RESOURCES>
   <ENGINEER>.2</ENGINEER>
   <STUDENT>1</STUDENT>
  </RESOURCES>
 </TEST>
 <TEST>
  <NAME>HSWx-RAID Platform-BASC-xxxx-0006</NAME>
  <OBJECTIVE>Volume creation Verify that Increase volume capacity
       commands can be issued successfully on snapshots and
       repositorires using SMcli.</OBJECTIVE>
  <CONFIGURATION>
   <NAME>2 x 1 x 2 x 3 ** CFG 5 **</NAME>
   <SERVER>2</SERVER>
```

```
<SWITCH>1</SWITCH>
<CONTROLLER_MODULE>2</CONTROLLER_MODULE>
<TRAYS>
<TRAY>
<COUNT>3</COUNT>
<DRIVES>18</DRIVES>
</TRAY>
<TRAY>
<COUNT>1</COUNT>
<DRIVES>12</DRIVES>
</TRAY>
</TRAYS>
</CONFIGURATION>
<STEPS>
<STEP>Run SANSCAN</STEP>
<STEP>Create 5 RAID volumes</STEP>
<STEP>Run I/O</STEP>
<STEP>Reset controller</STEP>
<STEP>verify that config are ACCESSED</STEP>
</STEPS>
<DURATION>.2</DURATION>
<RESOURCES>
<ENGINEER>.2</ENGINEER>
<STUDENT>1</STUDENT>
</RESOURCES>
</TEST>
<TEST>
<NAME>HSWx-Santricty Software- xxxx-0001</NAME>
<OBJECTIVE>healthStatusTest Purpose: This is intended to be a
    system test in a het host environment with several
    servers.</OBJECTIVE>
<CONFIGURATION>
<NAME>4 x 1 x 2 x 3 ** CFG 13 **</NAME>
<SERVER>4</SERVER>
<SWITCH>1</SWITCH>
<CONTROLLER_MODULE>2</CONTROLLER_MODULE>
<TRAYS>
<TRAY>
<COUNT>3</COUNT>
<DRIVES>18</DRIVES>
</TRAY>
<TRAY>
<COUNT>1</COUNT>
<DRIVES>12</DRIVES>
</TRAY>
</TRAYS>
</CONFIGURATION>
<STEPS>
<STEP>Run SANSCAN</STEP>
<STEP>Create 5 RAID volumes</STEP>
<STEP>Run I/O</STEP>
<STEP>Reset controller</STEP>
<STEP>verify that config are accessed</STEP>
</STEPS>
<DURATION>.5</DURATION>
<RESOURCES>
<ENGINEER>.2</ENGINEER>
<STUDENT>1</STUDENT>
</RESOURCES>
</TEST>
<TEST>
<NAME>HSWx-HostInterface-BASC-xxxx-0002</NAME>
<OBJECTIVE>Increase Configuration capacity</OBJECTIVE>
<CONFIGURATION>
<NAME>2 x 0 x 2 x 4 ** CFG 8 **</NAME>
<SERVER>2</SERVER>
<SWITCH>0</SWITCH>
<CONTROLLER_MODULE>2</CONTROLLER_MODULE>
<TRAYS>
<TRAY>
<COUNT>3</COUNT>
<DRIVES>18</DRIVES>
</TRAY>
<TRAY>
<COUNT>1</COUNT>
<DRIVES>12</DRIVES>
</TRAY>
</TRAYS>
</CONFIGURATION>
<STEPS>
<STEP>Run SANSCAN</STEP>
<STEP>Create 5 RAID volumes</STEP>
<STEP>Run I/O</STEP>
<STEP>Save MEL</STEP>
</STEPS>
<DURATION>.2</DURATION>
<RESOURCES>
<ENGINEER>.2</ENGINEER>
<STUDENT>1</STUDENT>
</RESOURCES>
</TEST>
<TEST>
<NAME>HSWx-New Cluster-BASC-xxxx-0001</NAME>
<OBJECTIVE>Increase volume capacity</OBJECTIVE>
<CONFIGURATION>
<NAME>2 x 1 x 2 x 2 ** CFG 8 **</NAME>
<SERVER>2</SERVER>
<SWITCH>1</SWITCH>
<CONTROLLER_MODULE>2</CONTROLLER_MODULE>
<TRAYS>
<TRAY>
<COUNT>1</COUNT>
<DRIVES>12</DRIVES>
</TRAY>
<TRAY>
<COUNT>1</COUNT>
<DRIVES>6</DRIVES>
</TRAY>
</TRAYS>
</CONFIGURATION>
<STEPS>
<STEP>Run SANSCAN</STEP>
<STEP>Create 5 RAID volumes</STEP>
<STEP>Run I/O</STEP>
<STEP>Save MEL</STEP>
</STEPS>
<DURATION>.2</DURATION>
<RESOURCES>
<ENGINEER>.2</ENGINEER>
<STUDENT>1</STUDENT>
</RESOURCES>
</TEST>
</TEST_DATA>
```

The present invention may have the following advantages. It may identify the new features requirement from a drop-down menu, which is based on the name of the new features. This menu has the capability of adding entries to new keys, which correspond to requirements, if the key does not exit. Moreover, it may automatically create descriptive keys for all new feature, sub-feature, or modified feature of a new product in the key. Additionally, it may automatically generate a test plan, which is required to verify the functionality and features of a new RAID product or an updated RAID product which is scoped to meet customer needs. The test plan is extracted and/or derived from an existing test cases database. Further, it may identify new tests required to verify the new features of the product under development. In addition, it may identify test areas, test cases, and/or test steps which require modification to handle new features or modified legacy features in the product under design. Moreover, it may enhance the granularity of the existing test cases stored in databases.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package.

Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magneto-optical disk, ROM, RAM, EPROM, EEPROM, magnetic or optical card, or any other suitable media for storing electronic instructions.

It is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for ensuring desired quality of a product having new features, comprising:
   receiving customer-desired features for the product via a user interface of a Quality Assurance system, the Quality Assurance system being a computer system;
   translating the customer-desired features into product design requirements via a translating means of said Quality Assurance computer system, said product design requirements being suitable for use in the Quality Assurance system;
   identifying product design requirements for said new features of said product;
   automatically generating a first test plan for said product by querying a database based on said product design requirements, said database storing a plurality of test plans, a plurality of test configurations, and a plurality of test scopes for previously tested versions of said product;
   determining whether the first test plan includes new tests for verifying said each new feature;
   receiving said new tests from a tester;
   upon reception of said new tests, updating said database by adding said new tests; and
   generating a test plan document for said product based on said updated database.

2. The method as described in claim 1, wherein said generated test plan document is verified through a comparison with a second test plan for said product, said second test plan being generated by querying updated database with said product design requirements.

3. The method as described in claim 1, wherein said test plan document includes a test scope, detail test cases, a test configuration, test resources, a test summary and a test duration.

4. The method as described in claim 1, wherein said product design requirements is suitable for being provided through a Graphic User Interface.

5. The method as described in claim 1, further comprising verifying said generated test plan document.

6. The method as described in claim 1, further comprising:
   identifying a product design requirement for a modified feature;
   providing new tests for said modified feature if the first test plan does not include said new test for said modified feature; and
   updating said database by adding said new tests if said new tests are provided.

7. The method as described in claim 6, further comprising generating descriptive keys for said new features and said modified features.

8. A non-transitory computer-readable medium having computer-executable instructions for performing a method via a Quality Assurance System for ensuring desired quality of a product, the method comprising:
   providing a Graphic User Interface of said Quality Assurance System, the Quality Assurance System being a computer system, said Graphic User Interface being suitable for receiving customer-desired features, said Quality Assurance System being configured for translating, via a translating means of the Quality Assurance computer system, the customer-desired features into product design requirements of said product and displaying a test plan document for said product;
   identifying new product design requirements for new features of said product, the new features being the customer-desired features provided by a customer, the product design requirements being translations of the customer-desired features, said product design requirements being suitable for use in a Quality Assurance system;
   determining whether new tests for verifying said new features are stored in a database;
   updating said database by adding said new tests if said new tests are not already stored in said database;
   generating said test plan document for said product based on said updated database; and
   verifying said generated test plan document, wherein said database stores a plurality of test plans, a plurality of test configurations, and a plurality of test scopes for previously tested versions of said product.

9. The computer-readable medium as described in claim 8, said determining step further comprising:
   automatically generating a first test plan for said product by querying said database based on said product design requirements; and
   determining whether said first test plan includes said new tests.

10. The computer-readable medium as described in claim 8, wherein said generated test plan document is verified through comparing with a second test plan for said product, said second test plan being generated by querying updated database with said product design requirements.

11. The computer-readable medium as described in claim 8, wherein said test plan document includes a test scope, detail test cases, a test configuration, test resources, a test summary and a test duration.

12. The computer-readable medium as described in claim 8, wherein said new features includes modified features.

13. The computer-readable medium as described in claim 12, wherein said Graphic User Interface is suitable for including a new entry to a new key if said new key does not exist.

14. The computer-readable medium as described in claim 13, further comprising automatically generating a plurality of descriptive keys for said new features in said new key, wherein said plurality of descriptive keys are utilized in said database.

* * * * *